Patented Dec. 8, 1925.

1,564,239

UNITED STATES PATENT OFFICE.

HOMER W. HILLYER, OF FARMINGTON, CONNECTICUT, ASSIGNOR TO NATIONAL ANILINE & CHEMICAL COMPANY, INC., OF NEW YORK, N. Y., A CORPORATION OF NEW YORK.

PRODUCTION AND ISOLATION OF ALKALI SALTS OF AROMATIC SULPHONIC ACIDS.

No Drawing. Application filed January 3, 1920. Serial No. 349,239.

*To all whom it may concern:*

Be it known that I, HOMER W. HILLYER, a citizen of the United States, residing at Farmington, in the county of Hartford, State of Connecticut, have invented certain new and useful Improvements in the Production and Isolation of Alkali Salts of Aromatic Sulphonic Acids; and I do hereby declare the following to be a full, clear, and exact description of the invention, such as will enable others skilled in the art to which it appertains to make and use the same.

This invention relates to an improved method for the production and isolation of alkali salts of aromatic sulphonic acids, i. e., aromatic alkali sulphonates, and more particularly to the production and isolation of such alkali sulphonates from solutions containing calcium salts of the sulphonic acids.

In the sulphonation of aromatic hydrocarbons and their derivatives, as commonly practiced, it is necessary to use a large excess of either concentrated or fuming sulphuric acid, in order that, as the process nears completion, and as the water formed by the reaction brings about a dilution of the smaller amount of remaining acid, there may nevertheless be a sufficiently concentrated acid present to carry the sulphonation to substantial completion. Accordingly, when the sulphonation process is completed, there is present a considerable excess of sulphuric acid in admixture with the sulphonic acid produced, and it is necessary to separate the sulphonic acid from this excess sulphuric acid, in order to obtain it in an isolated state.

Various methods have heretofore been proposed for separating the sulphonic acid from the excess of sulphuric acid contained in the sulphonation product. When the sulphonic acid is difficultly soluble in dilute mineral acid, a simple dilution of the reaction product with water may bring about separation of the sulphonic acid so that it can be filtered out. In certain cases, the addition of common salt in solid form or in solution to the diluted sulphonation product will bring about precipitation of the free sulphonic acid or of the neutral or acid sodium salt of the sulphonic acid from the still strongly acid solution. Both of these procedures, however, have the disadvantage that they require the handling and filtration of acid liquors.

It has also been proposed to neutralize the excess sulphuric acid, after dilution with water, by the addition of lime or calcium carbonate, with resulting production of a neutral soluble calcium salt of the sulphonic acid, and conversion of the sulphuric acid into insoluble calcium sulphate which is filtered off from the solution of the soluble calcium sulphonate. In the further treatment of the calcium salt solutions it has been proposed to add sodium carbonate for the purpose of precipitating the calcium as calcium carbonate and converting the calcium sulphonate into the sodium sulphonate which stays in solution. This solution, after filtration from the calcium carbonate, is then evaporated to dryness to obtain the solid sodium salt, or it may be treated by the addition of common salt in sufficient amount to cause salting out or precipitation of the sodium sulphonate. This procedure has the disadvantage and objection of requiring the use of sodium carbonate for the conversion of the calcium sulphonate into sodium sulphonate, and filtration of the precipitated calcium carbonate from the sodium sulphonate solution before this solution can be further treated for the recovery of the sodium sulphonate therefrom.

According to the present invention, such objections and disadvantages are avoided, and the sodium or other alkali sulphonates are directly produced from the calcium sulphonate solutions, as hereinafter more fully set forth. The process of the present invention is of more or less general application to the production and isolation of alkali sulphonates, i. e., the alkali salts of sulphonic acids of aromatic hydrocarbons and hydrocarbon derivatives, such as phenols, amines, etc., where such sulphonic acids form readily soluble calcium salts. The process of the present invention is further applicable to the production and isolation of such alkali sulphonates where the sulphonation is combined with other treatments, such as nitration, carried out in the presence of the excess of sulphuric acid remaining at the end of the sulphonation, and with subsequent recovery of the alkali nitrosulphonate from the sulphonation and nitration product.

According to the present invention, the aromatic hydrocarbon or its derivative is sulphonated in any suitable manner with an excess of concentrated or fuming sulphuric acid, and the sulphonation product, either with or without further treatment thereof, e. g., by nitration of the sulphonic acid in the presence of the excess sulphuric acid, is then diluted with water, and the excess sulphuric acid neutralized with lime or limestone, with resulting production of the soluble calcium salt of the sulphonic acid, and the precipitation of the excess sulphuric acid as the difficultly soluble calcium sulphate which is then removed from the calcium salt solution by filtration or otherwise. The calcium sulphonate solution is then treated with common salt or other alkali chloride in sufficient amount to bring about the conversion of the calcium sulphonate into the corresponding sodium or other alkali sulphonate and precipitation or crystallization of the alkali sulphonate thus produced, so that it can be recovered directly in a solid state, from the calcium salt solution, by a combined operation of double decomposition, and of salting out of the alkali sulphonate so formed. The common salt (sodium chloride) or other alkali chloride may be added in its solid form or in solution, and in sufficient amount for bringing about the desired reaction and precipitation or crystallization. By washing the precipitate of alkali sulphonate, after filtration, with a strong solution of the alkali chloride, it may be freed from admixed or adhering calcium salt.

Among the advantages presented by the present invention may be mentioned the avoidance of strongly acid solutions which act injuriously upon certain types of apparatus and the use of neutral or nearly neutral solutions of the calcium salt which have no injurious action upon the common types of apparatus, the avoidance of the use of sodium carbonate and the elimination of the filtration of calcium carbonate and of a separate subsequent treatment for recovery of the alkali sulphonate, and the direct production from the calcium sulphonate solution, by a single combined operation, of the alkali sulphonate in solid form, which can be recovered by filtration from the solution containing the calcium chloride, as well as any unchanged calcium sulphonate and unprecipitated alkali sulphonate.

The present invention is also applicable for the fractional separation of sulphonic acids forming difficultly soluble sodium salts from those forming readily soluble sodium salts. Thus certain alkali sulphonates are salted out by adding much less salt than others, and, by adding sufficient to salt out one of the sodium sulphonates, without adding sufficient to salt out the other or others, fractional separation can be effected, while the remaining alkali sulphonate or sulphonates may then be separated by a further addition of common salt to the solution.

In the commercial application of the process of the invention, the production of the sodium salts of the sulphonic acids will usually be the most important, but the invention is also applicable to the production of potassium salts of sulphonic acids, and of ammonium salts of sulphonic acids, where these salts are similarly formed and precipitated.

The extent to which the sulphonation product, containing the excess sulphuric acid, is diluted prior to the precipitation of the excess sulphuric acid as calcium sulphate, will vary with the amount of sulphuric acid present and with other conditions, but ordinarily the concentration of the diluted solution should be such that the gypsum is best precipitated while at the same time the calcium salt of the sulphonic acid is retained in solution. The diluted solution is preferably and advantageously treated with sufficient lime or calcium carbonate to insure the production of a neutral or slightly alkaline solution, but the advantages of the invention may nevertheless be secured to a greater or less extent if the neutralization is not complete, and if some small amount of the sulphuric acid remains un-neutralized, provided the degree of acidity is not prejudicial to the desired recovery of the alkali sulphonates. Instead of using lime or calcium carbonate for neutralization of the excess sulphuric acid, other suitable alkali earth compounds can be used, although I regard the use of lime or calcium carbonate as most advantageous.

The invention will be further illustrated by the following more specific description of certain embodiments thereof, but it is intended and will be understood that the invention is illustrated by, but is not limited to, the specific embodiments thereof so illustrated and described.

1. 78 kilos of benzene ($C_6H_6$) are added with stirring to 234 kilos of 100% sulphuric acid, and, after adding the benzene, the stirring is continued for about 30 minutes at a temperature of about 65 to 70° C. The sulphonation product thus produced, and containing the excess sulphuric acid, is then poured into 3000 liters of water and neutralized with a slight excess of milk of lime. The excess of sulphuric acid is thereby changed into the difficultly soluble calcium sulphate which is separated from the neutral solution by filtration. The solution contains the benzene sulphonic acid as the calcium salt. This solution is evaporated to somewhat less than one-third its volume, diluted to about 1000 liters, and again filtered to remove further amounts of calcium sulphate therefrom. To the filtrate there is added about 225 kilos of common salt, and the whole is vigorously stirred. The salt goes into solution and reacts with the calcium sulphonate with resulting formation of the sodium sulphonate which separates in a solid form from the solution which contains the calcium in the form of calcium chloride. That is, the added common salt (sodium chloride) reacts with the calcium sulphonate in solution to form calcium chloride and the alkali sulphonate, and the alkali sulphonate so formed is then salted out or precipitated by the excess common salt, so that there is produced, as the result of the reaction, the precipitated sodium sulphonate, and a solution containing calcium chloride and the excess of common salt. The sodium sulphonate is filtered out and washed with a strong common salt solution to free it from any calcium salts, and the sodium salt of benzene sulphonic acid is thus obtained in a state of sufficient purity to adapt it for commercial use or for further treatment.

2. 90 kilos of mono-chlor-benzene and 90 kilos of 66° Bé. sulphuric acid are stirred together vigorously and, to this mixture there is added gradually about 180 kilos of fuming sulphuric acid containing about 26% free sulphur trioxide. This acid is added at such a rate that the temperature does not rise above 100° C. Heat is then applied to keep the temperature of the mixture at about 100 to 105° C., until the odor of chlorbenzene is very slight, i. e., until the sulphonation has been practically completed. The sulphonation mixture thus produced and containing the excess of sulphuric acid, is diluted to about 1500 liters, heated to boiling, and treated with slaked lime until the solution is neutral or slightly alkaline to Congo paper. The precipitated calcium sulphate is filtered out and washed with water and the water added to the filtrate until the total volume of filtrate and wash water is about 2000 liters. The solution thus produced contains the calcium salt of the chlor-benzene-p-sulphonic acid. This solution is then treated to convert the calcium salt into the sodium salt and to bring about precipitation of the sodium salt. For this purpose, there is added an amount of common salt (sodium chloride) sufficient for this purpose. The addition of 320 kilos of common salt will bring about the separation of a crystalline precipitate, but the amount of this precipitate will be materially increased by the addition of still further amounts of common salt, e. g., about 160 kilos more. After stirring for about one-half hour, the precipitate of the sodium salt of the chlor-benzene-sulphonic acid is filtered off, washed with a 15% salt solution, and dried. The sodium salt is thus obtained as a dry crystalline solid, and is practically free from calcium salt.

3. Chlor-benzene is subjected to sulphonation for the production of the chlor-benzene-p-sulphonic acid, according to example 2, but instead of isolating the chlor-benzene-sulphonic acid in the form of its sodium salt, the sulphonation mixture, without dilution and still containing the excess of concentrated sulphuric acid, is subjected to nitration by the addition of mixed acid, i. e., a mixture of concentrated nitric and sulphuric acids, in appropriate amount for converting the chlor-benzene-sulphonic acid into the ortho-nitro-chlor-benzene-p-sulphonic acid. This nitration operation is carried out in the presence of the excess sulphuric acid which thus contributes to the nitration and which is present at the end of the nitration. For example, to the undiluted sulphonation mixture produced according to example 2, and cooled to about 20° C., there is gradually run in about 174 kilos of mixed acid containing 29% nitric acid, 65% sulphuric acid, and 6% water, and the temperature is kept between 30 and 50° C. Stirring is continued for some time after tendency to spontaneous heating ceases, and the reaction product, containing the excess acid, is then run into water with stirring, and thereby diluted with about five times its weight of water. There is thus produced a diluted solution of the nitro-chlor-benzene-sulphonic acid still containing the excess sulphuric acid from the sulphonation, as well as that added for the nitration. This solution is then treated with slaked lime, not allowing the temperature to rise above 40° C., until it is exactly neutral to Congo test paper, and it is then heated for some time to about 80° C. and then filtered out to remove the calcium sulphate which is washed with hot water. Or an excess of lime can be used for the neutralization, in which case the solution should not be heated so that objectionable hydrolysis will be avoided. The calcium salt of the nitro-chlor-benzene-sulphonic acid is converted into the sodium salt by the addition of sufficient sodium chloride to bring about the desired conversion of calcium to sodium salt and the separation of the sodium salt as a precipitate, for example, by adding common salt in the proportion of about 1 kilo to every 6 liters of the solution. The corresponding potassium and ammonium salts of the nitro-chlor-benzene-sulphonic acid may be similarly produced by adding about 1 kilo of potassium chloride or ammonium chloride, for every 10 liters of the above solution.

The conversion of the calcium salt in solution to the sodium salt is preferably carried out at room temperature or at a somewhat lower temperature owing to the increased solubility of the sodium salt in hot solutions, and the correspondingly less amount of salt required for precipitation of the sodium sulphonate at lower temperatures.

As above stated, the process of the present invention is of more or less general application to the production and isolation of aromatic sulphonic acids in the form of their alkali salts. As examples of other alkali salts which can be similarly produced and separated may be mentioned the sodium salts of phenol-sulphonic acid, pyro-catechin-disulphonic acid and ortho-amido-phenol-p-sulphonic acid.

In a companion application, Serial No. 355,157, filed January 30, 1920, I have described and claimed an improved method of producing ortho-nitro-chlor-benzol-p-sulphonic acid and its salts, and I do not claim the same herein except in connection with the improved process of the present invention for producing and isolating the alkali salts. The process of said companion application is of more general application, and is not limited to the production and isolation of the alkali salts in the manner herein described and claimed; while the process of the present invention is likewise of more general application and is not limited to specific improvements in the sulphonation process itself, except in combination with the subsequent novel procedure for the production and isolation of the alkali sulphonates.

I claim:

1. The method of converting soluble calcium salts of aromatic sulphonic acids into alkali salts of the same acids, which comprises treating a solution of such calcium salts with an alkali chloride, the amount of the alkali chloride being sufficient to bring about the conversion of the calcium sulphonate into the alkali sulphonate and the precipitation of the alkali sulphonate thus produced.

2. The method of producing sodium salts of aromatic sulphonic acids, which comprises treating a solution containing a calcium salt of the sulphonic acid with sodium chloride, whereby the sodium salt of the sulphonic acid is formed by double decomposition and is precipitated out of the solution.

3. The method of changing calcium salts of aromatic sulphonic acids into alkali salts of the same acids, which comprises adding to a solution of the calcium salt of the sulphonic acid alkali chloride, the alkali chloride being in sufficient excess to react with the calcium sulphonate by double decomposition to form and separate from solution the alkali salt of the sulphonic acid.

4. The method of producing alkali salts of chlor-substituted aromatic sulphonic acids, which comprises treating a solution containing a calcium salt of the chlorine substituted aromatic sulphonic acid with an alkali chloride, the amount of the alkali chloride being sufficient to react with the calcium salt by double decomposition and to form and precipitate the alkali salt of the sulphonic acid.

5. The method of producing alkali salts of nitro-substituted aromatic sulphonic acids, which comprises treating a solution containing a calcium salt of the nitro-substituted aromatic sulphonic acid with an alkali chloride, whereby the alkali salt of the nitro-substituted aromatic sulphonic acid is formed by double decomposition and precipitated out of the solution.

6. The method of producing sodium salts of nitro-chlor-substituted aromatic sulphonic acids, which comprises treating a solution containing a calcium salt of the nitro-chlor-substituted aromatic sulphonic acid with sodium chloride, whereby the sodium salt of the nitro-chlor-substituted aromatic sulphonic acid is formed by double decomposition and is precipitated out of the solution.

7. The method of converting soluble calcium salts of aromatic sulphonic acids of the benzene series into alkali salts of the same acids, which comprises treating a solution of such calcium salts with an alkali chloride, the amount of the alkali chloride being sufficient to bring about the conversion of the calcium sulphonate into the alkali sulphonate and the precipitation of the alkali sulphonate thus produced.

In testimony whereof I affix my signature.

HOMER W. HILLYER.